United States Patent

[11] 3,579,887

[72] Inventor Gunter Rochelt
7 Schulinstr. 1110, Ulm, Germany
[21] Appl. No. 789,466
[22] Filed Jan. 7, 1969
[45] Patented May 25, 1971

[54] DESK FRAME
8 Claims, 7 Drawing Figs.
[52] U.S. Cl. ................................................. 40/152.1
[51] Int. Cl. ................................................. G09f 1/12
[50] Field of Search ................................................. 40/358, 10
(D), 10, 152, 156, 152.1

[56] References Cited
UNITED STATES PATENTS
| | | | |
|---|---|---|---|
| 470,222 | 3/1892 | Townsend .................. | 40/10D |
| 2,145,071 | 1/1939 | Cave .......................... | 40/152X |
| 2,521,558 | 9/1950 | Alvarez ...................... | 40/152 |

Primary Examiner—Robert W. Michell
Assistant Examiner—Wenceslao J. Contreras
Attorney—Ostrolenk, Faber, Gerb & Soffen ABSTRACT: A frame for pictures and the like comprised of a transparent member and a lightweight supporting member having a much smaller total mass and weight than the transparent member. The supporting member positions and frames the transparent member on two opposite parallel sides while framing the picture inserted within the support member on all four sides so as to completely conceal the sides of the picture when the frame is fully assembled. The support member is provided with a recess along the rear surface to facilitate hanging of the frame upon a wall or other surface and is further provided with diagonally aligned support surfaces which together with the disposition of the center of gravity of the assembled frame, enables the frame to be supported diagonally relative to a support surface upon any of the diagonal aligned surfaces of the support member. In addition, the two opposite parallel sides of the support member which embrace the transparent member as well as the two exposed sides of the transparent member may be optionally employed as supporting surfaces for supporting the frame assembly in a vertically aligned fashion upon a suitable supporting surface.

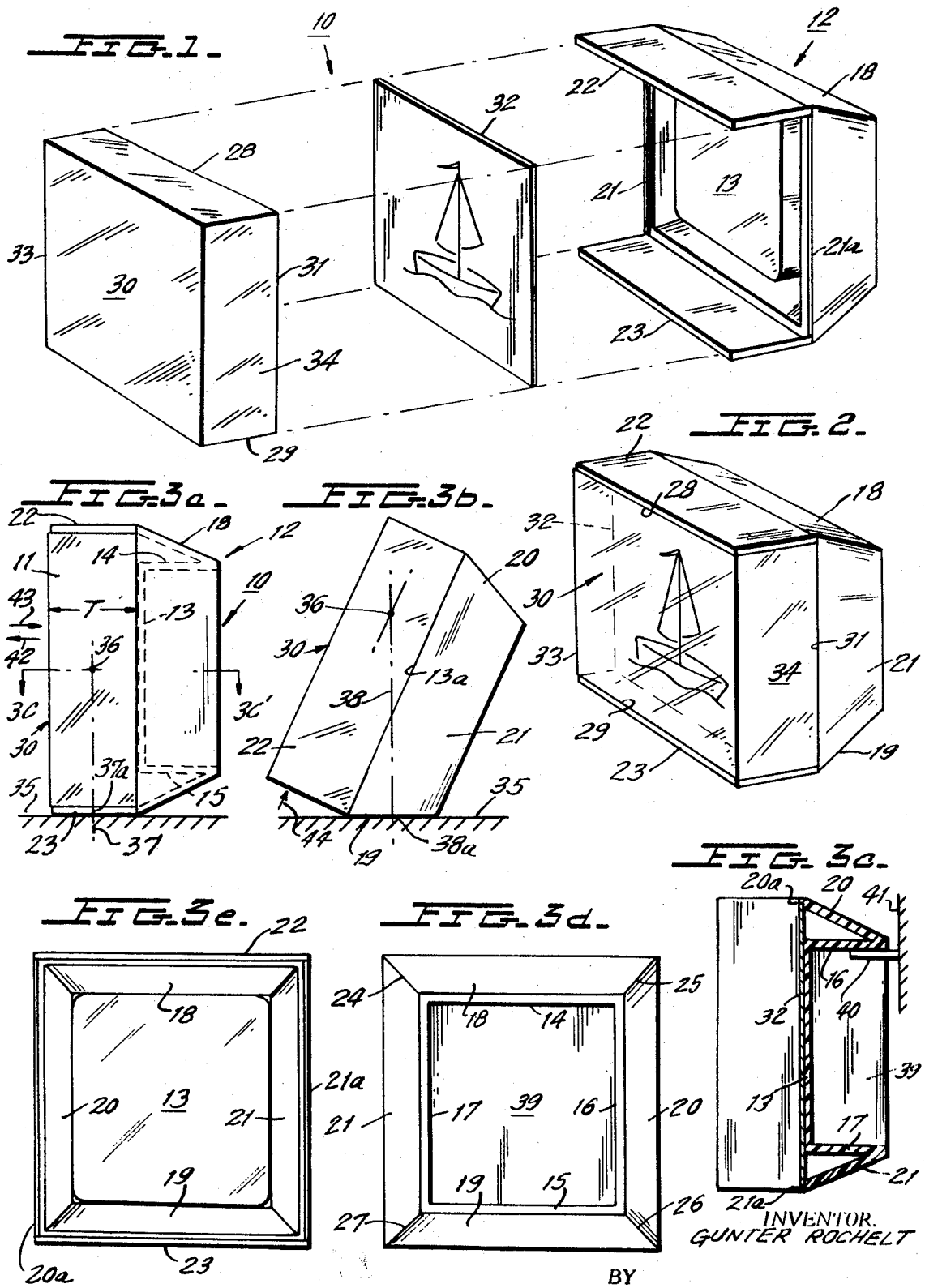

DESK FRAME

The present invention relates to picture frames and more particularly to a novel two-piece frame assembly for use in mounting pictures, photographs and the like, which has a versatility enabling the frame to be mounted upon a vertical support surface and either vertically or diagonally aligned and supported upon a suitable horizontal support surface.

There are presently available a variety of frames or frame assemblies for mounting pictures, photographs and the like. Frames generally fall into two categories, namely frames of the type adapted for mounting upon a wall and frames adapted for being supported upon a suitable horizontal surface such as tables, desk and the like. Conventional frames are normally comprised of a rectangular or square-shaped frame for framing the picture of photograph and a rigid backing member and a transparent member. The transparent member is inserted into the frame with the picture or photograph mounted between the backing and the transparent member with the rigid backing affixedly secured to the frame to firmly mount the picture between the transparent member and the backing member. Additional means are usually provided on the rear of the rigid backing member (such as, for example, a wire) for support upon a picture hook or other like wall-mounting device.

Desk or table frames are usually similar in nature to the frames described above and are further provided with a hinged support member secured to the rear of the rigid backing member in order to support the frame assembly upon a horizontal surface normally with the orientation of the frame being in the frame being diagonal relative to the support surface.

In order to either insert or replace the picture within the frame it is necessary to remove the rigid backing member from the frame assembly, place the picture against the transparent member and then replace the rigid backing member.

The present invention is characterized by providing a frame assembly adaptable for wall mounting or surface support, and further including a design which enables quick insertion and/or replacement of the picture within the frame as compared with conventional devices. The present invention is comprised of a solid substantially thick rectangular-shaped transparent member and a support member for receiving the picture and embracing the transparent member. The support member is provided with two spaced parallel sides for embracing the transparent member and is further provided with a recess in the rear surface thereof to facilitate hanging of the frame upon a vertical surface. The recess is bordered by diagonally aligned surfaces generally along the rear of the support member which may act as supporting surfaces for the frame assembly to enable it to be positioned upon a horizontal surface such as, for example, a desk or table with the frame being diagonally aligned relative to the supporting surface. The spaced parallel sides of the support member, while firmly embracing the transparent member, enable quick removal and replacement of the solid transparent member whether by lifting the transparent member directly away from the support member or by sliding the transparent member sidewise out of an embracing position between the spaced parallel sides of the support member.

The remaining spaced parallel sides of the support frame positioned between the spaced parallel sides of the support member which embrace the transparent member are provided with small grooves for receiving and positioning the picture mounted therein so as to completely conceal the edges of the picture when the frame is in the fully assembled state.

The mass of the transparent member is many times greater than the mass of the support member so that the transparent member is predominantly determinative of the center of gravity of the frame when fully assembled. The design of the support member relative to the transparent member is such that the center of gravity lies substantially directly above and is centrally located relative to the particular surface providing support for the frame when supported upon a horizontal surface such as a desk or table in either the vertically upright position or the diagonal position. Obviously the frame may be placed on its rear surface so as to be utilized as a combination picture frame and paper weight, if desired.

It is therefore one object of the present invention to provide a novel frame assembly for photographs, pictures and the like which is designed to be wall mounted or supported in a variety of positions upon a horizontal surface.

Another object of the present invention is to provide a novel two-piece frame assembly for use in mounting pictures, photographs and the like and being comprised of a support member embracing a solid transparent member of appreciable thickness in such a manner as to facilitate simple removal and replacement of the picture and transparent member.

Still another object of the present invention is to provide a novel frame assembly for use in mounting photographs, pictures and the like comprised of a solid transparent member of substantial thickness and a lightweight supporting member designed to support the frame when assembled either on its back, directly upright or diagonally aligned relative to a horizontal supporting surface wherein the center of gravity of the frame when fully assembled lies immediately above the surface of the frame assembly coming into contact with the vertical supporting surface which supports the frame.

These as well as other objects of the present invention will become apparent when reading the accompanying description and drawings in which:

FIG. 1 is a perspective view showing the elements of the frame of the present invention in an exploded view.

FIG. 2 is a perspective view of the frame shown in FIG. 1 in fully assembled fashion.

FIG. 3a shows a side view of the frame of FIGS. 1 and 2 being supported upon a horizontal surface.

FIG. 3b shows another side view of the assembly of the FIGS. 1 and 2 being diagonally aligned upon a horizontal supporting surface.

FIG. 3c shows a sectional view of the assembly of the FIG. 3a looking in the direction of arrows 3c–3c'.

FIGS. 3d and 3e are rear and front elevational views, respectively, of the frame portion as shown in FIG. 1.

The frame of the present invention, making reference to all of the FIGS., is a two-piece assembly 10 comprised in turn, of a solid, rectangular-shaped transparent member 11 having substantial thickness, and a support member 12 made of a lightweight material preferably plastic. The support frame 12 is preferably opaque and may be of any desired color.

The support frame 12 is a one-piece member comprised of a substantially flat and rigid backing member 13 serving as the backing for the photograph, picture and the like, in a manner to be more fully described. The backing portion 13 which is substantially rectangular in shape (and may, in fact, be substantially square in shape, if desired) is integrally joined with four rearwardly directed sides 14—16, respectively, which, in turn, are integrally joined with four diagonally aligned and forwardly directed sides 18—21, respectively. Two of the four diagonally aligned sides, namely sides 18 and 20, are integrally joined to spaced parallel sides 22 and 23, respectively. Adjacent diagonally aligned sides are integrally joined along their adjacent edges at vertices 24.

The transparent member 11 in the preferred embodiment shown in the drawings is a solid parallelepiped formed of a clear plastic material such as, for example, Plexiglas. When assembled with the support member, two opposite parallel sides 28 and 29 are arranged to be rather firmly embraced by sides 22 and 23 respectively, of the support member, as shown best in FIGS. 1, 2 and 3a. The thickness T of the transparent member 11 is substantially equal to the length of each of the sides 22 and 23 when measured along their interior surfaces so that the front face 30 of the transparent member is substantially flush with the edges of sides 22 and 23. A picture, photograph or other like work of art portrayed on a sheet is sandwiched between the rear face 31 of transparent member 11 and the front face 13a of backing member 13.

The forward edges of diagonally aligned sides 20 and 21 are provided with small flanges 20a and 21a which are designed to frame the adjacent marginal edges of picture 32 so as to completely conceal the picture mounted between backing plate 13 and transparent member 11 when the frame is fully assembled as shown best in FIGS. 2 and 3c.

The characteristic of the transparent member of Plexicube 11 causes the picture to appear to be pulled toward the front face 30 of the transparent member due to its high index of refraction thereby providing an even and solid framing for the picture. The optical characteristic of the transparent member also prevents viewing from the picture along the two sides 33 and 34 of the transparent member which extend between the sides 22 and 23 of the support member, thus creating the rather unique optical characteristic of appearing to contain no pictorial material within the assembled frame.

The frame may be placed upon a desk, table or other horizontal surface in an upright position on any one of its four sides or alternatively it may stand at an angle being supported on any one of its diagonally aligned sides. In addition thereto, the assembled frame may be aligned horizontally with its back surface resting upon a horizontal surface or alternatively the frame assembly may be hung upon a wall. The center of gravity of the assembled frame is substantially the center of gravity of the transparent member which is approximately six times greater in weight than the lightweight support member. FIG. 3a shows the frame standing upright upon a horizontal surface 35. The center of gravity is indicated as the point 36 which can be seen to be directly above side 23 acting as the supporting surface and which further can be seen to lie along an imaginary vertical line 37 which lies substantially midway between the ends of side 23 enabling the frame to stand upright without toppling. Obviously, the frame may be stood upright by placing the opposite parallel side 22 upon surface 35. As a further alternative, the frame may stand upright with either of the two exposed surfaces 33 and 34 of transparent member 11 resting upon the support surface. Obviously, in the same manner as described with regard to FIG. 3a, the center of gravity of the assembled frame will lie directly above the side (either 33 or 34) of the transparent member resting on the horizontal surface and being substantially equidistant from the opposite edges of the above-mentioned side (33 or 34).

The assembled frame may further be placed upon a horizontal supporting surface so as to be aligned diagonally relative to the supporting surface by having any one of the four diagonally aligned sides 18—21 resting upon the horizontal supporting surface. FIG. 3 shows the assembled frame diagonally aligned upon a supporting surface 35 wherein the assembled frame is resting upon diagonally aligned side 21. Obviously, any of the three remaining diagonally aligned sides may be arranged to rest upon the horizontal supporting surface and the description of the weight distribution for the arrangement of FIG. 3b applies in equal measure to any of the other diagonal alignments possible. As shown in FIG. 3b, the center of gravity 36 lies directly above side 21 and further lies along an imaginary straight line 38 which intersects side 21 at a point 38a which is substantially equidistant from the edges of diagonally aligned side 21. Thus, the frame, when stood at an angle upon a supporting surface will firmly remain in this position without toppling due to the unique relationship of the center of gravity of the assembled frame relative to the surface of the frame which rests upon the horizontal supporting surface.

The frame may obviously be placed upon a horizontal surface with the front face 30 of transparent member 11 being arranged substantially parallel to the supporting surface. In this position the assembled frame may serve the dual function of acting as a combined assembled frame for pictures and the like and as a paper weight for use on desk, tables or the like.

The recess 39 formed in the rear surface of supporting member 12 and defined by sides 14—17 and the rear surface of backing member 13 enables the frame to be hung upon a wall in the manner shown in FIG. 3c. A fastener such as a nail or screw 40 may be driven into a vertical support surface or wall 41. Side 16 of the assembled frame, shown in FIG. 3c, rests upon and is supported by fastening member 40. To simplify the balancing of the frame upon the wall, a pair of fastening members of the type 40 may be driven into the wall 41, if desired.

Assembly and disassembly of frame may be performed quite simply by grasping exposed sides 33 and 34 of the transparent member 11 with the fingers of one hand and by grasping the support member 12 with the other hand and lifting the transparent member away from the support member in the direction shown by arrow 42 in FIG. 3a. The picture, photograph or the like may then be placed against the front face of backing member 13 and centered between sides 22 and 23 and flanges 20a and 21a. The transparent member may then be replaced by pressing the transparent member between sides 22 and 23 and moving the transparent member in a direction shown by arrow 43 of FIG. 3a relative to support member 12. By pressing the transparent member 11 firmly against support member 12 in the direction shown by arrow 43, the transparent member will be caused to "snap" into position between sides 22 and 23 and flanges 20a and 21a so as to completely conceal the picture 32 within the assembled frame.

As an alternative method, the transparent member 11 may be removed from support member 12 by pressing one exposed side (33 or 34) in a direction shown by arrow 44 of FIG. 3b, causing the transparent member 11 to move in the direction of arrow 44 relative to support member 12 so as to remove the transparent member from the assembled frame. A photograph may then be positioned within the support member in the same manner as previously described and the transparent member may be replaced either by pressing the transparent member into the support member in the direction shown by arrow 43 or by sliding the transparent member sidewise relative to support member 12, as shown in FIG. 3b.

The frame assembly described herein may be either square or rectangular and may be of any dimension compatible with either standard size or special size photographs, prints and the like.

It can be seen from the foregoing description and drawings that the present invention provides a novel frame assembly for use with pictures, photographs and the like which is simple to assemble and disassemble, is quite versatile either in that it may be either hung upon a wall or placed upon a horizontal supporting surface in a variety of different positions without any danger of toppling and which totally conceals a picture or photograph therein without the need for any fastening means whatsoever. The unique configure of the frame reduces the number of components of the frame as compared with conventional picture frames as well as providing a unique configuration which may rest upon a supporting surface in a variety of different positions and angles without requiring a hinged supporting member as is normally employed in conventional desk frames.

Although there has been described a preferred embodiment of this novel invention, many variations and modifications will now be apparent to those skilled in the art. Therefore, this invention is to be limited, not by the specific disclosure herein, but only by the appending claims.

I claim:

1. A frame for photographs, pictures and the like comprising
   a transparent member, said member having a parallelepiped configuration:
   a support member having a substantially planar forward surface;
   a pair of spaced parallel sides projecting outwardly from said forward surface for removably receiving and embracing two opposite sides of said transparent member leaving the remaining two sides of said transparent member exposed;
   said forward surface being adapted to cooperate with an adjacent surface of said transparent member for retaining a picture therebetween;

said support member having at least one surface along its rearward side which is diagonally aligned relative to said forward surface and is adapted to rest upon a horizontal support surface for aligning said frame in a diagonal fashion relative to said support surface;

said one surface extending between said forward surface and said rearward side and being adapted to support the side surface of said transparent member closest to said supporting surface above and diagonally aligned relative to the supporting surface.

2. The frame of claim 1 wherein the weight of said transparent member is at least two times as great as the weight of said support frame to place the center of gravity substantially along the perpendicular bisector of said diagonally aligned surface enabling the frame to be diagonally supported upon said support surface without toppling.

3. The frame of claim 1 wherein the rear surface of said support member is provided with a recess adapted to receive suitable fastening means which is driven into a wall mounting of said frame upon a wall.

4. The frame of claim 1 wherein the weight of said transparent member is substantially greater than the weight of said support member and is preferably at least twice the weight of said support member; to place the center of gravity of the assembled frame substantially along the perpendicular bisector of any of the sides of said support member and said exposed sides of said transparent member enabling any one of the exposed sides of said transparent member and the pair of sides of said support member to rest upon a horizontal support surface to firmly support said frame at a right angle to the support surface without toppling.

5. A frame for photographs, pictures and the like comprising a transparent member, said member having a parallelepiped configuration;

a support member having a substantially planar forward surface;

a pair of spaced parallel sides projecting outwardly from said forward surface for removably receiving and embracing two opposite sides of said transparent member leaving the remaining two sides of said transparent member exposed;

said forward surface being adapted to cooperate with an adjacent surface of said transparent member for retaining a picture therebetween;

said support member having first, second, third and fourth surfaces along its rearward side which are diagonally aligned relative to said forward surfaces and are each adapted to rest upon a horizontal support surface for aligning said frame in a diagonal fashion relative to said support surface.

6. The frame of claim 5 wherein the weight of said transparent member is at least two times as great as the weight of said support frame to place the center of gravity substantially along the perpendicular bisector of each of said diagonally aligned surfaces enabling the frame to be diagonally supported upon said support surface without toppling.

7. The frame assembly of claim 5 wherein the forward facing edges of two of said diagonally aligned sides each extend between the extreme left- and right-hand ends respectively of said pair of spaced parallel sides which are integrally joined to the forward facing edges of associated ones of the remaining diagonally aligned sides;

the forward facing edges of said two diagonally aligned sides each being provided with a flange extending slightly above its forward facing surface and aligned along the outer side of said edge for framing picture placed upon said forward surface and concealing the adjacent edge of the picture when said frame is assembled.

8. The frame of claim 7 wherein the forward facing edges of the said remaining diagonally aligned surfaces are each of a thickness greater than the thickness of the associated one of said parallel sides integrally joined thereto to form a shoulder for supporting the adjacent marginal edge of a picture and thereby prevent the sheet containing the picture from curling or become distorted.